US007838102B2

(12) United States Patent
Phillips

(10) Patent No.: US 7,838,102 B2
(45) Date of Patent: Nov. 23, 2010

(54) FILLED POLYVINYL BUTYRAL SHEETING FOR DECORATIVE LAMINATED GLASS AND A PROCESS FOR MAKING SAME

(75) Inventor: Thomas R. Phillips, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 973 days.

(21) Appl. No.: 11/260,059

(22) Filed: Oct. 27, 2005

(65) Prior Publication Data

US 2006/0110590 A1 May 25, 2006

Related U.S. Application Data

(60) Provisional application No. 60/623,087, filed on Oct. 28, 2004.

(51) Int. Cl.
*B32B 7/00* (2006.01)
(52) U.S. Cl. .............. 428/212; 428/220; 428/323; 428/426; 524/425; 524/435; 524/437; 524/493; 524/556
(58) Field of Classification Search .......... 428/212, 428/220, 323, 426; 524/425, 435, 437, 493, 524/556
See application file for complete search history.

(56) References Cited

U.S. PATENT DOCUMENTS

| 3,153,009 A | 10/1964 | Rombach |
| 3,449,184 A * | 6/1969 | Balk .................... 156/105 |
| 3,876,552 A | 4/1975 | Moynihan |
| 4,626,570 A * | 12/1986 | Gardner .................. 525/12 |
| 5,244,941 A * | 9/1993 | Bruckbauer et al. ......... 523/171 |
| 5,886,075 A | 3/1999 | Keane et al. |
| 6,524,694 B1 * | 2/2003 | Phillips .................... 428/323 |
| 2002/0016399 A1 | 2/2002 | Mazur |
| 2002/0169236 A1 | 11/2002 | Halterman et al. |
| 2003/0104743 A1 | 6/2003 | Weberg et al. |
| 2004/0147671 A1 * | 7/2004 | Milic et al. ............... 524/589 |

FOREIGN PATENT DOCUMENTS

| JP | 59 064550 | 4/1984 |
| JP | 60 016840 | 1/1985 |
| JP | 07 292133 | 11/1995 |
| JP | 7-330392 | 12/1995 |
| JP | 2000072496 A * | 3/2000 |
| JP | 2000 136309 | 5/2000 |
| WO | WO 03/093000 A1 | 11/2003 |

OTHER PUBLICATIONS

PCT International Search Report for International Application No. PCT/US2005/039171 dated Feb. 28, 2006.

* cited by examiner

*Primary Examiner*—David R Sample
*Assistant Examiner*—Lawrence D Ferguson
(74) *Attorney, Agent, or Firm*—Kevin S. Dobson

(57) ABSTRACT

The present invention is a decorative interlayer, or a laminate obtained therefrom, wherein the aesthetic qualities can be matched to solid surface materials used in such applications as countertops, for example. The interlayers of the present invention comprise at least one composite filler material obtained from ground solid surface materials.

16 Claims, No Drawings

FILLED POLYVINYL BUTYRAL SHEETING FOR DECORATIVE LAMINATED GLASS AND A PROCESS FOR MAKING SAME

CROSS-REFERENCE TO RELATED APPLICATION

This application claims the benefit of U.S. Provisional Application No. 60/623,087, filed Oct. 28, 2004.

FIELD OF THE INVENTION

The present invention relates to laminated glass. More specifically, the present invention relates to decorative laminated glass having a filled decorative interlayer.

BACKGROUND OF THE INVENTION

Decorative countertops obtained from such solid surface materials as Corian®, Wilsonart®, Avonite®, or stone such as granite, for example, are popular and can provide a very pleasing look to a kitchen or other room where these materials are used. These, and other decorative solid surface materials can come in various designs, and are functionally tough and resistant to mars, scratches, and breakage. In addition, these materials can be easily cleaned using conventional cleaners and detergents.

While smooth glass shares many of these same attributes, glass can break or crack under typical countertop use in a kitchen, for example. Also, conventional decorative glass can be fragile, or designs painted on the surface can be ruined over time and/or with continuous contact. Therefore, it is not conventional to use conventional decorative glass in a functional application such as a kitchen countertop. However, using glass to match the designs in the decorative solid surfaces in a room or building can be desirable.

Plasticized polyvinyl butyral sheet (PVB) is used in the manufacture of laminate structures such as, for example: windshields for vehicles including automobiles, motorcycles, boats and airplanes; homes and buildings; shelving in cabinets and display cases; and other articles where structural strength is desirable in a glass sheet. In many applications, it is desirable that the laminate be transparent and colorless. In other applications it can be desirable that the laminate provide a decorative design or appearance, or bear a color or shade. Decorative glass laminates bearing images or solid colors have been described previously. For example, the entry to the E.P. Foster Library, Ventura, Calif. designed by Sally Weber and the Carnegie Library in Pittsburgh, Pa.

However, decorative glass laminates of this type are primarily obtained by printing on the surface of the interlayer, and therefore provide a 2-dimensional image that may not be discernable from obscure angles. 2-Dimensional images may not diffuse light in a way that would provide depth of the visual effect, which can be an important aspect of the aesthetic character of the decorative laminate. This may be particularly true in the case of an image designed to match a solid surface design.

While decorative glass laminates can be useful in a variety of applications, use of decorative glass laminates is not widespread in end-use applications such as furniture, cabinetry, countertops, tabletops, and the like. The design of decorative solid surface materials can be difficult to reproduce in such applications using conventional methods.

It can be desirable to provide a decorative glass laminate having the ability to match the aesthetic characteristics of decorative solid surface materials, and at the same time provide the attributes of a standard safety glass laminate.

SUMMARY OF THE INVENTION

In one aspect, the present invention is a decorative interlayer composition wherein the interlayer comprises a thermoplastic resin having blended therewith at least one composite filler comprising particles wherein at least about 80 wt % of the filler particles are retained on a number 80 U.S. standard sieve, wherein the interlayer: (1) has a haze of from about 20 to about 100 percent (2) transmits from about 10 to less than about 90 percent of incident light, and (3) has clarity of from about 1 to 80 percent, and wherein the at least one filler consists essentially of a composite material obtained from a composition comprising a mineral filler interspersed in a thermoset polymer matrix.

In another aspect, the present invention is a laminate comprising a decorative interlayer, wherein the decorative interlayer comprises a thermoplastic resin having blended therewith at least one composite filler comprising particles wherein at least about 80 wt % of the filler particles are retained on a number 80 U.S. standard sieve, wherein the interlayer: (1) has a haze of from about 20 to about 100 percent (2) transmits from about 10 to less than about 90 percent of incident light, and (3) has clarity of from about 1 to 80 percent, and wherein the at least one filler consists essentially of a composite material obtained from a composition comprising a mineral filler interspersed in a thermoset polymer matrix.

In another aspect, the present invention is a process for producing a decorative interlayer suitable for laminated glass applications, the process comprising the steps of (a) feeding at least one composite filler consisting essentially of a composite material obtained from a composition comprising a mineral filler in a thermoset polymer matrix into an extruder at a controlled rate; (b) co-extruding a thermoplastic resin, the composite filler, plasticizer, and optional additives; (c) quenching the molten sheet composition to obtain the decorative interlayer having dimensional stability suitable for laminated glass applications, wherein the interlayer: (1) has a haze of from about 20 to about 100 percent (2) transmits from about 10 to less than 90 percent of incident light, and (3) has clarity of from about 1 to 80 percent, and wherein at least about 80 wt % of the composite filler particles are retained on a number 80 standard sieve, and wherein the at least one composite filler material consists essentially of a composite material obtained from a composition comprising a mineral filler in a thermoset polymer matrix.

DETAILED DESCRIPTION OF THE INVENTION

In one embodiment, the present invention is an interlayer comprising filler particles. An interlayer of the present invention can be obtained from any material known to be useful as an interlayer material in the manufacture of glass laminate articles. For example, the interlayer material can be an acid copolymer or a salt thereof, such as for example, an ethylene/methacrylic acid copolymer or a neutralized version thereof. The interlayer material can be a polyurethane polymer, an ethylene/vinyl acetate (EVA) copolymer, a polyester polymer, or a polyvinyl butyral (PVB) polymer. Such interlayer materials can be obtained commercially from various manufacturers.

Preferably the interlayer material comprises a plasticized PVB polymer, an EVA copolymer, or an ethylene acid copolymer or a copolymer comprising an acid derivative.

More preferably the interlayer material comprises PVB. PVB can be obtained commercially from, for example, E.I. DuPont de Nemours and Company (DuPont) or from Solutia, and used in the practice of the present invention.

Alternatively, PVB used herein can be manufactured and used herein to obtain the interlayers of the present invention. Polyvinyl butyral suitable for use in the practice of the present invention can be prepared according to any method known or conventionally practiced in the manufacture of PVB sheeting. For example, U.S. Pat. No. 3,153,009 describes a process for commercial manufacture of PVB that is suitable for use in the practice of the present invention. PVB resins used in the practice of the present invention can be prepared by mixing PVA with butyraldehyde in an aqueous medium in the presence of an acid or mixture of acids, at a temperature of from 5° C. to 100° C.

Typically, the ratio of PVA to butyraldehyde is chosen such that the PVB has residual hydroxyl functionality, conventionally reported as weight percent polyvinyl alcohol. Residual hydroxyl functionality can vary according to what properties are desirable in the PVB. The relative amounts of butyraldehyde and PVA required to obtain the desired residual weight percent polyvinyl alcohol in the PVB resin will be readily apparent to those skilled in the art of PVB manufacture. In the practice of the present invention residual hydroxyl can be in the range of from about 14 to about 30 weight percent. Preferably, the residual weight percent polyvinyl alcohol is from about 15 to about 25. More preferably, the residual weight percent polyvinyl alcohol is from about 15 to about 20, and most preferred in the practice of the present invention is PVB resin having a residual weight percent polyvinyl alcohol in the range of from about 17 to about 19. The residual weight percent polyvinyl alcohol can be determined according to standard methods such as ASTM D1396-92.

An interlayer of the present invention includes a composite filler material. A composite filler material of the present invention comprises or consists essentially of small particles obtained from solid surface material, wherein the solid surface material is a composite of a finely divided mineral filler dispersed in a thermoset organic polymer matrix. The composite filler material can optionally include at least one pigment component. The composite filler as used in the practice of the present invention imparts a decorative look to the interlayer and to the laminate obtained from the interlayer. Commonly used mineral fillers used in the solid surface materials include $CaCO_3$ (calcium carbonate), silica, and alumina. Such mineral fillers can also include oxides such as titanium oxide. A suitable polymer matrix is preferably a thermoset polymer matrix. The thermoset polymer matrix can be obtained from such polymeric materials as acrylic resins, polyester resins, or epoxy resins for example. In a preferred embodiment, the polymeric material that forms the matrix is an alkyl acrylate, wherein the alkyl group comprises from 1 to 6 carbons. In a particularly preferred embodiment, the polymeric matrix is formed from methylmethacrylate. The method of preparing the solid surface material is not critical to the practice of the present invention, however suitable methods are known and described in various publications. For example, a suitable method for preparing a solid surface material is described in U.S. Pat. Pub. 2002/0016399. The solid surface material can additionally optionally comprise pigments, other colorants, or other additives that add to the decorative appearance of the solid surface material.

The composite filler can be obtained from the solid surface material by forming the solid surface material into particles having a suitable size for use in the practice of the present invention. Any conventional method for reducing a larger mass to smaller particles can be used in the practice of the present invention. For example, grinding or pulverizing a solid surface composite polymer into small particles can be suitable in the practice of the present invention. For practical considerations, the size of the filler particles is limited by the size of particle that can pass through the processing equipment. Removal of particulate filters from extrusion equipment can facilitate the process described herein. Preferably, particles of composite filler suitable for use herein have an average particle size wherein at least about 80 wt % of the particles are retained on a number 80 standard sieve. Preferably at least about 85 wt % of the composite filler particles are retained on a No. 80 sieve. More preferably at least about 90 wt % of the composite filler is retained on a No. 80 sieve.

In a particularly preferred embodiment, at least about 65 wt % of the composite filler particles pass through a No. 12 U.S. Standard sieve. In another particularly preferred embodiment of the present invention, 100 wt % of the composite filler particles pass through a No. 12 U.S. Standard sieve.

An interlayer of the present invention can optionally comprise a colorant such as a dye or pigment, for example. A colorant of the present invention can be any material that is mixed with the PVB composition and that imparts color to a sheet formed from PVB. The term "colorant" can also refer to a "mixture of colorants". Colorants useful in the practice of the present invention can be added either in solid form, as a solution, or as a solid/liquid dispersion to the PVB composition. For example, dyes or pigments can be added in liquefied form to the PVB for ease of processing. Dyes are generally soluble in a PVB resin matrix and will add color but not contribute to haze in the interlayer.

The concentration of the composite filler in the interlayer can be adjusted to achieve the desired aesthetic effect. The concentration of the composite filler is selected such that the desirable decorative effect is obtained while obtaining light transmission that is suitable and appropriate for the intended application. Unlike most other applications employing glass laminates comprising an interlayer, in the practice of the present invention the interlayer is not expected to be substantially transparent to incident light. While the amount of light transmitted can vary from application to application and there is no particularly preferable range for transmission, an interlayer or laminate of the present invention typically will transmit at least about 10% of incident light. Light transmission can be determined by any conventional method used for such a determination. For example, a conventional spectrophotometer can be used to determine the percent light transmitted by an interlayer of the present invention.

Composite filler can be added to a PVB composition of the present invention at a concentration of as low as about 1.0 wt % up to a concentration of about 20 wt %. The concentration of the filler can be varied to obtain the desired decorative effect in the laminate, and therefore there is no particularly preferred range for all laminates of the present invention. However, it is contemplated that for a particular aesthetic design, there may be a preferred range of loading for the composite filler. However, for general guidance in the practice of the present invention, it should be noted that below about 1 wt % loading of the filler, the decorative effect may not be substantial. Above about 20 wt % loadings the aesthetic effect may not be substantial relative to loadings of 20 wt %, while the effect of higher loadings may be to detract from other desirable properties of the interlayer. Depending on other factors, such as particle size for example, the concentration of composite filler added in the practice of the present invention can exceed the range disclosed herein and yet still be within the scope of the invention contemplated herein. It is contemplated that it is within the skill of the practitioner to achieve a balance between the desired decorative effects and the functional properties of the interlayer.

Careful selection and/or manipulation of the particle size of the composite fillers can control the clarity and diffusive power of the sheet and the resulting laminates. The particle size of the composite filler can be controlled by conventional methods such as use of an appropriately sized sieve. Alternatively, the desired size of particle can be obtained from commercial manufacturers of the composite filler.

Without being held to theory, there may be a direct relationship between particle size and clarity and an inverse relationship between particle size and haze. For any given concentration of composite filler, the larger the particles, the greater clarity and the lower the haze in the PVB sheet and the resulting laminates. The smaller the particles, the less clarity, the greater haze, and the more diffusive power exhibited by the sheet and the resulting laminates. Clarity is also related to the loading of composite filler. Clarity of interlayers of the present invention should be within the range of from about 1 to about 80%, and preferably at least 2%.

The haze of an interlayer sheet of the present invention is related to the diffusive power. The haze of a particular interlayer or laminate is related to the loading of composite filler, which can be varied to obtain the aesthetic qualities sought by a designer. In an interlayer composition of the present invention, the diffusive power, as measured by percent haze on an instrument such as, for example, a hazemeter, is preferably in the range of from about 20 percent to about 100 percent.

In a particularly preferred embodiment, the present invention is a PVB composition comprising a plasticizer. Plasticizers of the present invention can be chosen from any that are known or used conventionally in the manufacture of plasticized PVB sheeting compositions. Preferably the plasticizer is either triethylene glycol di-(2-ethylhexanoate) (3GO), tetraethylene glycol di-heptanoate (4G7), or di-butyl sebacate (DBS). Most preferably the plasticizer is 3GO.

Plasticizer can be added in any amount, but is preferably added in an amount of from about 5 to about 50 parts per hundred (pph) resin, based upon the total dry weight of the resin. The "dry weight" as used herein refers to the weight of the dry resin, that is, after water has been removed from the resin. Preferably the plasticizer is present in an amount of from about 20 to about 45 pph, and most preferably in an amount of from about 32 to about 45 pph.

Plasticization can be carried out using conventional processes, as described in U.S. Pat. Nos. 3,153,009 or 5,886,075, for example.

A surfactant is included in preparing a PVB composition of the present invention. Any conventional surfactant useful in the manufacture of PVB are considered useful in the practice of the present invention. Preferable surfactants include sodium lauryl sulfate, sodium dioctyl sulfosuccinate, sodium cocomethyl tauride, and decyl(sulfophenoxy)benzenesulfonic acid disodium salt.

Other additives can be included optionally in a resin composition of the present invention. Examples of such additives include antioxidants, light stabilizers, adhesion control agents, and/or surface tension controlling agent.

In another embodiment, the present invention is a laminate comprising the interlayer sheet of the present invention. The laminate can be obtained from any combination of interlayer with glass or plastic materials. For example, a laminate of the present invention can be comprised of glass and the interlayer of the present invention, or the laminate can be comprised of a polymeric material and the interlayer of the present invention, or the laminate can be comprised of a combination of glass and a polymeric material with the interlayer of the present invention. A polymeric material suitable for use with the interlayer of the present invention can be any polymeric material known to be suitable for use in applications such as are described herein. Suitable polymers are, for example: polycarbonates; acrylic acid and/or acrylic ester polymers and copolymers methacrylic acid and/or methacrylic ester polymers and copolymers; or polyesters can be suitable thermoplastic materials for use herein. Preferably, the laminate is a glass laminate, comprising at least one piece of glass adhered with the interlayer of the present. A laminate of the present invention can optionally include other non-decorative interlayer materials in combination with the decorative interlayer of the present invention. Suitable non-decorative materials are those materials that are known and used conventionally as interlayers in transparent laminates, examples of which are described herein. A laminate of the present invention can be any combination of glass laminated to glass (glass/glass), glass/plastic, or plastic/plastic. Use of multiple layers of the rigid structural material are contemplated herein. Other combinations of glass or plastic, or glass and plastic, with other materials such as metals, wood, or stone for example, are contemplated as within the scope of the present invention. Multiple layers of decorative interlayer are contemplated as within the scope of the present invention, as are any combination of at least one decorative interlayer with at least one non-decorative interlayer. Also contemplated as within the scope of the present invention are combinations of decorative interlayers as described herein with other decorative interlayers. One of ordinary skill in the art can utilize the teachings of the present invention in a conventional manner to obtain other variants of the present invention that are not specifically named herein without venturing outside of the scope contemplated for the present invention. An adhesive layer may or may not be required to obtain a stable and cohesive laminate, depending on the combination of layers desired in the laminate. In any event, use of an adhesive can be considered as conventional in the fabrication of the laminates described herein. A laminate of the present invention can be assembled according to known and conventional practices. For example, a laminate of the present invention can be assembled by a process comprising the steps: layering a glass sheet, an interlayer of the present invention, and another glass sheet together under heat and pressure to form the laminate. Various techniques for improving the quality of the laminate are known and conventional, such as roughening the surface of the interlayer prior to lamination in order to provide channels to allow air to escape from the laminate during the lamination process. Application of a surface pattern can be optional, and can depend on the thermoplastic interlayer material used in preparing a laminate of the present invention.

A laminate of the present invention can be used in the production of decorative articles. For example, a laminate of the present invention can be used as decorative glass in cabinets, cabinet doors, tabletops, table covers, countertops, entry doors, door panels, shower doors, floor tiles, ceiling tiles, wall tiles, stair treads, wall backsplash, appliance doors, appliance covers, room dividers, shelving, and cabinets. Other examples can be contemplated by one of ordinary skill in the art.

In another embodiment, the present invention is a process for preparing a decorative interlayer. A decorative interlayer of the present invention can be obtained by co-extruding PVB with at least one composite filler and a plasticizer. The extrusion can be carried out at a temperature in the range of from about 175° C. to about 245° C. depending, at least in part, on how much plasticizer is included. The extruded sheet can be quenched, or cooled, to a temperature at or below about 40° C but above a temperature of about 1 0° C. Preferably the sheet is cooled to a temperature below about 25° C., more preferably the sheet is cooled to a temperature below about 200, and most preferably the sheet is cooled to a temperature below about 15° C. The extruded sheet can be rolled and stacked for storage. In any event, a sheet of the present invention can be used to make a laminate as described hereinabove.

EXAMPLES

The following Examples and comparative examples are presented to further illustrate the present invention. The Examples are not intended to limit the scope of the invention in any manner, nor should they be used to define the claims or specification in any manner that is inconsistent with the invention as claimed and/or as described herein.

Test Methods

Haze/Clarity/Transmission

Haze is determined according to ASTM D1003, and is defined as the percentage of transmitted light that deviates from the incident by more than 2.5 degrees. Clarity is defined as the percentage of transmitted light that deviates from the incident light by less than 2.5 degrees. Haze/Clarity measurements were obtained using either a Byk-Gardner Haze-gard® Plus (HG Plus) or a Hunter Lab Ultrascan® Sphere Spectrophotometer (Ultrascan).

Compressive Shear Strength

The compressive shear strength is determined by sawing a laminate into six 2.54 cm×2.54 cm chips. The chips are held in a jig at 450 and a compression testing instrument is used to place force on the chip at the rate of 0.25 cm/min. The amount of force to cause cohesive failure of the glass-PVB bond is the compressive shear strength of the laminate. For typical architectural applications, the compressive shear adhesion should be at least 1800 N/cm2 (2600 psi).

Pummel Adhesion Test

The laminate is conditioned to −18° C. for a minimum of 3 hours. The chilled laminate is held at a 45° angle on a metal plate and struck with a 454 g (1 lb) hammer until the glass was broken. All broken glass not adhered to the sample is removed. The glass remaining on the interlayer is visually compared to a set of standards. The higher the number, the more glass that remains on the interlayer i.e., at zero pummel, 0% of the glass remains on the sheet whereas at a 10 pummel, 100% of the glass remains on the interlayer.

Tensile Creep

Tensile creep measurements are performed by clamping a conditioned (23% relative humidity/16 hours) 19.05×101.6 mm (0.75×4 in.) strip of sheeting at one end and attaching a load to the other end. The elongation of the strip is measured at 30 minutes to determine the tensile creep at a load of 69 kPa (10 psi). The test temperature is 65° C.

The samples are marked with parallel lines at 1, 3, 7, and 9-cm. The upper clamp is attached at the 1-cm mark and the load at the 9-cm mark. The distance between the 3- and 7-cm marks is measured with a cathetometer before and after the 30-minute test.

The log of the tensile creep is calculated by Equation 1.

Tensile Creep=log [$(l_f-l_o)/l_o \times 100$]     Eq. 1 where $l_o$=initial gage length, cm $l_f$=gage length at 30 minutes

Tensile Strength

The tensile strength is determined by an Instron method. Using an Instron Universal Testing Instrument Model II23 in the controlled atmosphere with a "C" tensile cell in the stationary crossbeam and with film grips and a crosshead speed of 500-mm/minute, five ASTM D-1708-84, conditioned (23% relative humidity/16 hours) die cut specimens are tested.

Tensile strength is calculated according to Equation 2.

Tensile strength, psi=[$L/(T \times 0.187)$]     Eq. 2 where L=breaking load, lb T=thickness, in. 0.187 =sample width, in.

Stiffness

The 5% secant modulus is determined by an Instron method. Using an Instron Universal Testing Instrument Model II23 in the controlled atmosphere with a "B" tensile cell in the stationary crossbeam and with film grips and a crosshead speed of 50-mm/minute, five die cut, conditioned (23% relative humidity/16 hours) and weighed specimens measuring 19.05 mm×203.2 mm (0.75 in.×8.0 in.) are tested. The 5% Secant Modulus (stiffness) is calculated by Equation 3.

$$\text{Stiffness, } psi = \frac{A}{453.6} \times \frac{100}{B} \times \frac{L \times (2.54)^3 \times D}{S} \qquad \text{Eq. 3}$$

where: A=load in grams from chart at elongation B
B=elongation of measurement (5%) L=length of specimen D=density of specimen S=sample wt

Example 1

To a mixture of dry PVB resin, 3GO plasticizer, UV light stabilizer, and a thermal stabilizer was added composite filler KJ (ground Corian® having a mixture of particles, characterized in that 65 wt % passes through a No. 12 U.S. standard sieve. A homogenous blend was obtained after tumble blending for 2 hours. The blend was fed into a 25:1 L:D single screw extruder (19.05 mm diameter) having a zoned temperature profile of: Zone 1—110° C.; Zones 2, 3 and 4—190° C. The resulting strand was air quenched in a pan, and re-extruded two more times to ensure homogeneity. The extrudate was finally pressed into a plaque and laminated to glass using conventional techniques. The haze, clarity, and the % transmission of light were measured on a Byk Gardner "hazegard" (HG) Plus.

Examples 2-4

The procedures described for Example 1 were repeated except that different loadings of filler were used in each case. The results are given in Table 1.

TABLE 1

| Ex. | Filler (wt %) | Plasticizer (wt %) | UV Stabilizer (wt %) | Thermal Stabilizer (wt %) | Clarity (%) | Haze (%) | Transmission (%) |
|---|---|---|---|---|---|---|---|
| 1 | KJ (1.50) | 26.03 | 0.12 | 0.20 | 92.5 | 27.6 | 81.9/87.5[a] |
| 2 | KJ (3.00) | 26.05 | 0.12 | 0.20 | 88.6 | 41.3 | 78.2/86.0[a] |

TABLE 1-continued

| Ex. | Filler (wt %) | Plasti-cizer (wt %) | UV Stabilizer (wt %) | Thermal Stabilizer (wt %) | Clarity (%) | Haze (%) | Transmission (%) |
|---|---|---|---|---|---|---|---|
| 3 | KJ (4.50) | 26.05 | 0.12 | 0.20 | 75.5 | 66.1 | 74.3/84.3[a] |
| 4 | KJ (6.00) | 26.05 | 0.12 | 0.20 | 55.9 | 84.3 | 64.8/76.7[a] |

[a]Transmission normalized to that of sheet having 0.76 mm thickness.

Examples 5-9

The procedure of Example 1 was followed, except that a ground Corian® SM-type filler was used (100 wt % of the particles pass through a No. 12 U.S. standard sieve) at the specified loadings. The results are summarized in Table 2.

TABLE 2

| Ex. | Filler (wt %) | Plasti-cizer (wt %) | UV Stabilizer (wt %) | Thermal Stabilizer (wt %) | Clarity (%) | Haze (%) | Transmission (%) |
|---|---|---|---|---|---|---|---|
| 5 | SM (8.0) | 17.67 | 0.08 | 0.13 | 13.7 | 97.6 | 33.4/56.7[a] |
| 6 | SM (10.0) | 17.15 | 0.08 | 0.13 | 6.0 | 98.7 | 25.7/50.1[a] |
| 7 | SM (2.0) | 19.26 | 0.09 | 0.15 | 76.8 | 62.0 | 73.1/83.5[a] |
| 8 | SM (4.0) | 18.73 | 0.09 | 0.14 | 55.6 | 85.0 | 58.5/75.0[a] |
| 9 | SM (6.0) | 18.20 | 0.08 | 0.14 | 30.0 | 94.4 | 44.7/65.9[a] |

[a]Transmission normalized to that of sheet having 0.76 mm thickness.

Examples 10-13

To a 83 mm W&P twin screw extruder was added individually and simultaneously: dried PVB resin; 3GO plasticizer which included thermal and ultraviolet light stabilizers; and SM filler. An adhesion control agent (3:1 (wt:wt) potassium: magnesium, as potassium acetate and magnesium acetate) was also added. The extruder fed a nominal 100 cm slot sheeting die, and the resulting sheeting controlled to nominally 0.76 mm thickness. The sheeting was quenched on a chill drum and wound into rolls. The composition of each Example is provided in Table 3. The sheeting obtained was tested and the results are given in Table 4.

TABLE 3

| Ex. | Filler (wt %) | Plasti-cizer (wt %) | UV Stabilizer (wt %) | Thermal Stabilizer (wt %) | Hals Light Stabilizer | Potassium ion (ppm) |
|---|---|---|---|---|---|---|
| 10 | SM (2.7) | 26.2 | 0.12 | 0.20 | 0.03 | 72.5 |
| 11 | SM (6.2) | 25.1 | 0.11 | 0.19 | 0.03 | 77.5 |
| 12 | SM (10.4) | 24.1 | 0.11 | 0.18 | 0.03 | 73.0 |
| 13 | SM (10.3) | 24.1 | 0.11 | 0.18 | 0.03 | 66.5 |

TABLE 4

|  | Ex. 10 | Ex. 11 | Ex. 12 | Ex. 13 |
|---|---|---|---|---|
| Transmission (%) measured/normalized | 79.8/79.2 | 63.2/65.0 | 48.4/48.4 | 46.5/48.4 |
| Haze (%) | 38.9 | 77.5 | 90.2 | 91.2 |
| Tensile creep (log %) | 1.39 | 1.34 | 1.33 | 1.31 |
| Stiffness (psi) | 1903 | 1956 | 2215 | 2552 |
| Tensile Strength (psi) | 3239 | 2533 | 2412 | 2569 |
| Demin. CSS (psi) | 4216 | 4473 | 4621 | 4254 |
| PA | 8 | 8 | 8 | 8 |

Example 14

Pelletized Elvax® 3182 (EVA resin available from E.I. DuPont de Nemours and Company) and SM-type filler were co-extruded in the same manner as described in Example 1. The extruded resin was pressed into a plaque and laminated between glass sheets by conventional methods. Transmission, clarity, and haze were measured on a Byk Gardner HG Plus. The results are provided in Table 5.

Example 15

Pelletized ionoplast resin (ethylene/methycrylic acid copolymer resin, approximately 19% acid prior to neutralization, available from E.I. DuPont de Nemours and Company) and SM-type filler were co-extruded in the same manner as described in Example 1. The extruded resin was pressed into a plaque and laminated between glass sheets by conventional methods. Transmission, clarity, and haze were measured on a Byk Gardner HG Plus. The results are provided in Table 5.

TABLE 5

| Ex. | Filler (wt %) | Clarity (%) | Haze (%) | Transmission (%) | Transmission[a] (%) |
|---|---|---|---|---|---|
| 14 | 6.0 | 47.8 | 89.1 | 48.0 | 99.8 |
| 15 | 6.0 | 49.1 | 90.6 | 48.6 | 99.8 |

[a]Transmission normalized to that of sheet having 0.76 mm thickness.

What is claimed is:

1. A laminate comprising at least one decorative interlayer, wherein the decorative interlayer comprises a thermoplastic resin having blended therewith at least one composite filler; said at least one composite filler comprising filler particles wherein about 65 wt % of the filler particles pass through a number 12 U.S. standard sieve, wherein the decorative interlayer: (1) has a haze of from about 20 to about 100 percent (2) transmits from about 10 to less than about 90 percent of incident light, and (3) has clarity of from about 1 to 80 percent, and wherein the at least one filler consists essentially of a composite material obtained from a composition comprising a mineral filler interspersed in a thermoset polymer matrix; said laminate having two or more attributes of a standard safety glass laminate, said attributes selected from the group consisting of a compressive shear strength of at least 1800N/cm$^2$; a tensile creep of at least 1.31; a stiffness of at least 1903 psi; a tensile strength of at least 2412 psi; and a pummel adhesion rating of at least 8.

2. The laminate of claim 1 wherein the interlayer comprises from about 1 wt % to about 20 wt % of the at least one composite filler.

3. The laminate of claim 1 wherein the mineral filler is selected from minerals in the group consisting of: CaCO$_3$ (calcium carbonate), silica, alumina, and oxides.

4. The laminate of claim 3 wherein the thermoset polymer matrix is formed from a polymer selected from polymers in the group consisting of: acrylic resins; polyester resins; and epoxy resins.

5. The laminate of claim 4 wherein the thermoset polymer matrix is formed from an alkyl acrylate comprising an alkyl group having from 1 to 6 carbon atoms.

6. The laminate of claim 5 wherein the thermoset polymer matrix is formed from methyl methacrylate.

7. The laminate of claim 1 wherein the laminate comprises at least one sheet of glass.

8. The laminate of claim 7 wherein the laminate further comprises at least one additional polymeric interlayer that is a non-decorative interlayer material.

9. The laminate of claim 1 wherein the laminate comprises multiple layers of the decorative interlayer.

10. An article comprising the laminate of claim 1.

11. The article of claim 10 wherein the article is a cabinet door, a tabletop, a table cover, a countertop, an entry door, a door panel, a shower door, floor tiles, ceiling tiles, a stair tread, wall tiles, a wall backsplash, an appliance door, an appliance cover, a room divider, shelving, a cabinet.

12. The laminate of claim 1 wherein the thermoset polymer matrix is formed from a polymer selected from polymers in the group consisting of: acrylic resins; polyester resins; and epoxy resins.

13. The laminate of claim 3 wherein the mineral filler comprises titanium oxide.

14. The laminate of claim 1, wherein the thermoplastic resin is selected from the group consisting of a polyurethane polymer, an ethylene/vinyl acetate copolymer, a polyester polymer, a polyvinyl butyral polymer, an ethylene acid copolymer, a salt of an ethylene acid copolymer, a copolymer comprising an acid derivative.

15. The laminate of claim 14, wherein the thermoplastic resin comprises a plasticized polyvinyl butyral polymer.

16. A process for preparing a decorative laminate comprising the steps: (1) blending a thermoplastic resin with at least one composite filler; (2) extruding the resin/composite filler blend as a sheet or film suitable for use as an interlayer; and (3) laminating the interlayer with at least one other transparent material, the composite filler comprising filler particles wherein about 65 wt % of the filler particles pass through a number 12 U.S. standard sieve, and wherein the interlayer: (i) has a haze from about 20 to about 100 percent (ii) transmits from about 10 to less than 90 percent of incident light, and (iii) has clarity of from about 1 to 80 percent, and wherein the at least one filler consists essentially of a composite material obtained from a composition comprising a mineral filler interspersed in a thermoset polymer matrix;

said laminate having two or more attributes of a standard safety glass laminate, said attributes selected from the group consisting of a compressive shear strength of at least 1800N/cm$^2$; a tensile creep of at least 1.31; a stiffness of at least 1903 psi; a tensile strength of at least 2412 psi; and a pummel adhesion rating of at least 8.

* * * * *